US007972238B2

(12) United States Patent
Hayashi et al.

(10) Patent No.: US 7,972,238 B2

(45) Date of Patent: Jul. 5, 2011

(54) WORKING VEHICLE

(75) Inventors: Kazuhiko Hayashi, Komatsu (JP); Kazushi Nakata, Komatsu (JP); Toshihiko Fukasawa, Nomi (JP)

(73) Assignee: Komatsu Ltd., Tokyo (JP)

( * ) Notice: Subject to any disclaimer, the term of this patent is extended or adjusted under 35 U.S.C. 154(b) by 641 days.

(21) Appl. No.: 12/142,135

(22) Filed: Jun. 19, 2008

(65) Prior Publication Data

US 2009/0036270 A1 Feb. 5, 2009

(30) Foreign Application Priority Data

Jul. 30, 2007 (JP) ................................ 2007-197677

(51) Int. Cl.

*G62D 11/06* (2006.01)
*F16H 47/04* (2006.01)
*F16H 61/48* (2006.01)

(52) U.S. Cl. ................................ 475/23; 475/72; 477/54

(58) Field of Classification Search .................... 475/18, 475/19, 22, 23, 24, 72, 76; 477/52, 54, 62; 180/6.3

See application file for complete search history.

(56) References Cited

U.S. PATENT DOCUMENTS

| | | | | |
|---|---|---|---|---|
| 4,184,387 | A * | 1/1980 | Kiritani et al. | 475/22 |
| 5,101,919 | A * | 4/1992 | Ossi | 180/6.2 |
| 6,640,178 | B2 * | 10/2003 | Wakamatsu et al. | 701/51 |
| 7,246,670 | B2 | 7/2007 | Hayashi et al. | |
| 2005/0070391 | A1 * | 3/2005 | Folsom et al. | 475/23 |
| 2006/0167607 | A1 * | 7/2006 | Nakamura et al. | 701/50 |

FOREIGN PATENT DOCUMENTS

JP 2005-273902 A 10/2005

* cited by examiner

*Primary Examiner* — Roger Pang

(74) *Attorney, Agent, or Firm* — Global IP Counselors

(57) ABSTRACT

In a working vehicle, a control unit is configured to control an engine based on an engine power curve indicating a relationship between an engine speed and an engine output torque. The control unit is further configured to calculate an absorption horsepower that is an absorption horsepower of a hydraulic pump and to change the engine power curve used to control the engine based on the absorption horsepower.

4 Claims, 5 Drawing Sheets

| | L/C ON | | L/C OFF | |
|---|---|---|---|---|
| | FIRST CONTROL MODE | SECOND CONTROL MODE | FIRST CONTROL MODE | SECOND CONTROL MODE |
| $Lp < \alpha_1$ | L3 | L5 | L1 | L3 |
| $\alpha_1 \leqq Lp \leqq \alpha_2$ | L2 | L4 | | |
| $Lp > \alpha_2$ | L1 | L3 | | |

Fig. 5

WORKING VEHICLE

CROSS-REFERENCE TO RELATED APPLICATIONS

This application claims priority to Japanese Patent Application No. 2007-197677, filed on Jul. 30, 2007. The entire disclosure of Japanese Patent Application No. 2007-197677 is hereby incorporated herein by reference.

BACKGROUND OF THE INVENTION

1. Field of the Invention

The present invention relates to a working vehicle, and particularly relates to a working vehicle with a hydrostatic steering system.

2. Background Information

Working vehicles exist that travel as a result of power of an engine being transmitted to left and right propelling wheels by a first power transmission mechanism having a torque converter and transmission, etc. Such working vehicles with a hydrostatic steering system include a hydraulic oil pump driven by an engine, a hydraulic motor driven by pressurized oil from the hydraulic pump, and a second power transmission mechanism that transmits drive power of the hydraulic motor to the left and right drive wheels. The vehicle is then made to turn by making the speeds of the left and right drive wheels different using drive force of the hydraulic motor.

With this kind of hydrostatic steering system for a working vehicle, some of the output torque of the engine is used as absorption torque for the hydraulic pump in order to cause the vehicle to turn, and the remaining engine output torque is used as torque converter absorption torque for causing the vehicle to advance. It is therefore feared that the absorption torque of the torque converter will fall and that the traction performance will fall when the absorption torque of the hydraulic pump becomes larger as a result of increases in turning load. Further, there is the fear that engine speed will fall when the load on the engine becomes large.

With the hydrostatic steering system working vehicle of the related art, working vehicles exist where absorption torque of a hydraulic pump is controlled based on the speed ratio of the torque converter (refer to Japanese laid-Open Patent Application No. 2005-273902). The speed ratio of the torque converter is reduced or increased in accordance with increases in and falls in the traveling load. This working vehicle is therefore capable of controlling the absorption torque of the hydraulic pump in such a manner that turning performance is given priority when the traveling load is comparatively small. Further, it is possible to control the hydraulic pump absorption torque in such a manner that the required turning performance is ensured even when the traveling load is comparatively large.

SUMMARY OF THE INVENTION

However, even with the working vehicles of the related art described above, both the engine speed and the traction performance can fall when the turning load is large as a result of the absorption torque of the hydraulic pump becoming large.

The problem tackled by the present invention is therefore to provide a working vehicle capable of suppressing reduction of engine speed and reduction of traction performance during turning.

The working vehicle of a first aspect of the present invention includes an engine, a left drive wheel and a right drive wheel, a first power transmission mechanism, a hydraulic pump, a turning mechanism, and a control unit. The left drive wheel and the right drive wheel are configured and arranged to be driven by a drive force from the engine. The first power transmission mechanism is configured and arranged to transmit the drive force from the engine to the left drive wheel and the right drive wheel. The hydraulic pump is configured and arranged to be driven by the drive force from the engine. The turning mechanism has a hydraulic motor configured and arranged to be driven by pressurized oil from the hydraulic pump and a second power transmission mechanism configured and arranged to transmit the drive force of the hydraulic motor to the right drive wheel and the left drive wheel. The turning mechanism is configured and arranged to cause the working vehicle to turn by differentiating a rotational speed of the right drive wheel from a rotational speed of the left drive wheel. The control unit is configured to control the engine based on an engine power curve indicating a relationship between an engine speed and an engine output torque. The control unit is configured to calculate an absorption horsepower that is an absorption horsepower of a hydraulic pump and to change the engine power curve used to control the engine based on the absorption horsepower.

With this working vehicle, the engine power curve used to control the engine can be changed based on the absorption horsepower. Namely, it is possible to change the engine output torque based on the absorption horsepower. The absorption horsepower is changed according to the turning load. It is therefore possible to appropriately control the engine output torque according to the turning load at the working vehicle. As a result, it is possible to suppress falls in the engine speed and the traction performance when turning.

The working vehicle of a second aspect of the present invention is the working vehicle of the first aspect of the present invention, where the control unit is configured to change the engine power curve used to control the engine to a high-torque engine power curve when the absorption horsepower increases.

With this working vehicle, the control unit changes the engine power curve to a high-torque engine power curve according to increases in the absorption horsepower and controls the engine. The absorption torque is increased according to increases in the turning load. It is therefore possible to increase the output horsepower of the engine according to increases in the turning load by changing the engine torque curve to a high-torque engine torque curve as described above. As a result, it is possible to suppress falls in the engine speed and traction performance when the turning load increases at the working vehicle.

The working vehicle of a third aspect of the present invention is the working vehicle of the second aspect of the present invention, where the control unit is configured to selectively execute a first control mode that targets high engine output and a second control mode that targets low engine output. The control unit is also configured to change the engine power curve used to control the engine within a predetermined first range when the first control mode is selected, and to change the engine power curve used to control the engine within a predetermined second range encompassing a lower torque than the first range when the second control mode is selected.

With this working vehicle, in the first control mode that targets high engine output, the engine is controlled using an engine torque curve within a first range where engine output torque is comparatively large. Powerful operation with increased work performance and improved traveling performance is therefore possible. Further, the engine torque curve is changed within the first range based on the absorption horsepower. It is therefore possible to control the engine output torque appropriately according to the turning load. This means that it is possible to suppress falls in the engine speed and the traction performance during turning. Further, in the second control mode that targets low engine output, the engine is controlled using an engine torque curve within the second range where engine output torque is comparatively small. Operation where fuel consumption is superior and where the fuel consumption of the working vehicle is reduced is therefore possible. Further, it is possible to change the engine torque curve to within the second range based on this absorption horsepower. This means that it is possible to appropriately control the engine output torque according to the turning load even when executing the second control mode that targets low engine output. It is therefore possible to suppress falls in engine speed and traction performance during turning.

The working vehicle of a fourth aspect of the present invention is the working vehicle of the first aspect of the present invention, where the first power transmission mechanism has a torque converter with a lock-up clutch. The control unit is configured to change the engine power curve used to control the engine based on the absorption horsepower when the lock-up clutch is engaged.

When the lock-up clutch of the torque converter is engaged, an output shaft of the engine and an output side of the torque converter are directly coupled. It is therefore particularly easy for the engine speed to fall as a result of the load of the output side of the torque converter being transmitted to the engine. However, with this working vehicle, the engine power curve is changed based on the absorption horsepower when the lock-up clutch is engaged. It is therefore possible to suppress lower of the engine speed.

BRIEF DESCRIPTION OF THE DRAWINGS

Referring now to the attached drawings which form a part of this original disclosure:

FIG. 5 is a table showing change in an engine power curve in response to steering absorption horsepower.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

1. Configuration

Figure 1:
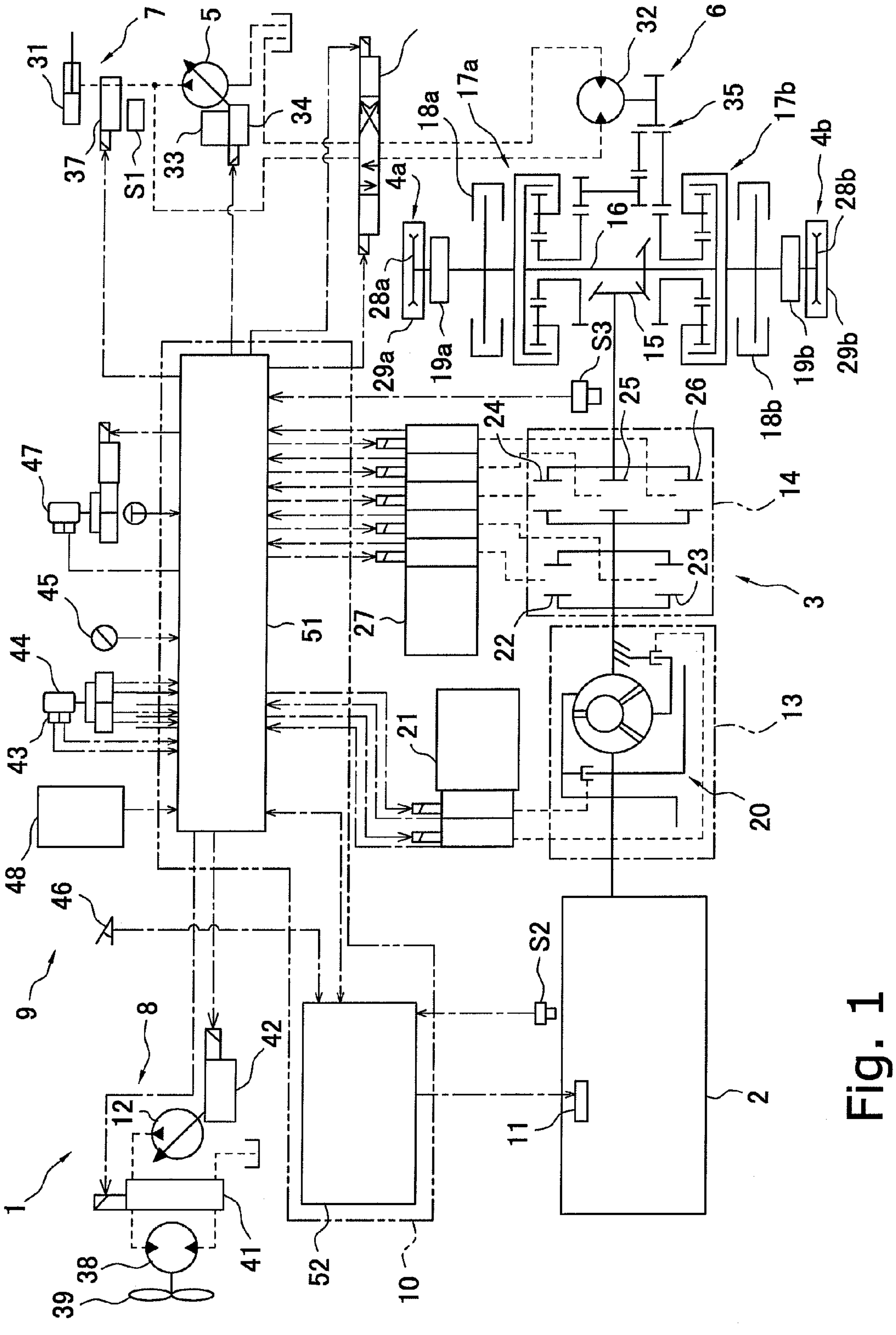
FIG. 1 is an outline view showing a configuration for a working vehicle.

An outline configuration view of a working vehicle 1 of a first embodiment is shown in FIG. 1. This working vehicle 1 is, for example, a bulldozer equipped with an engine 2, a first power transmission mechanism 3, a pair of traveling apparatus 4*a*, 4*b*, a first hydraulic pump 5, a turning mechanism 6, working equipment 7, a cooling mechanism 8, an operation unit 9, various sensors, and a control unit 10, etc.

1-1. Engine 2

The engine 2 is a diesel engine. Output of the engine 2 is controlled by regulating an amount of fuel injected from a fuel injection pump (not shown). Regulation of the amount of fuel injected is carried out as a result of a governor 11 fitted at the fuel injection pump being controlled by the control unit 10. A typical all-speed control system governor can be used as the governor 11. The engine speed and the fuel injection amount are then regulated according to the load so that the actual engine speed becomes the engine speed set by the control unit 10.

The drive force of the engine 2 is distributed between the first power transmission mechanism 3, the first hydraulic pump 5, and a second hydraulic pump 12 described in the following via a power take-off assembly (not shown).

1-2. First Power Transmission Mechanism 3

The first power transmission mechanism 3 is a mechanism for transmitting drive force from the engine 2 to the pair of traveling apparatus 4*a*, 4*b* and includes a torque converter 13, a transmission 14, a bevel gear 15, a horizontal shaft 16, a pair of planetary gear mechanisms 17*a*, 17*b*, a pair of brake assemblies 18*a*, 18*b*, and a pair of final reduction gears 19*a*, 19*b*.

The torque converter 13 is coupled to an output shaft of the engine 2. This torque converter 13 has a lock-up clutch 20 that directly couples the input side and the output side of the torque converter 13. The lock-up clutch 20 can be switched between being on and being off by pressurized oil supplied by a hydraulic pump (not shown). The supply of pressurized oil to the lock-up clutch 20 is controlled by a torque converter operation valve 21 controlled by an instruction signal from the control unit 10. Here, "on" refers to when the clutch is engaged, and "off" refers to when the clutch is not engaged.

The transmission 14 has a forward hydraulic clutch 22 and a reverse hydraulic clutch 23. Going forward or going in reverse then takes place as a result of either of the forward hydraulic clutch 22 or the reverse hydraulic clutch 23 being selected to be on. The forward hydraulic clutch 22 and the reverse hydraulic clutch 23 can be switched over between being on and being off by pressurized oil supplied by the hydraulic pump (not shown).

Further, the transmission 14 has a first speed hydraulic clutch 24, a second speed hydraulic clutch 25, and a third speed hydraulic clutch 26. It is then possible to switch gear by selecting one of these gear clutches to be on. The first speed hydraulic clutch 24, the second speed hydraulic clutch 25, and the third speed hydraulic clutch 26 can be switched over between being on and being off by pressurized oil supplied by the hydraulic pump (not shown).

The supply of pressurized oil to the forward hydraulic clutch 22, the reverse hydraulic clutch 23, the first speed hydraulic clutch 24, the second speed hydraulic clutch 25, and the third speed hydraulic clutch 26 are controlled by a transmission operation valve 27. The transmission operation valve 27 can be controlled by an instruction signal from the control unit 10.

The drive force of the engine 2 outputted by the transmission 14 is transmitted to the pair of planetary gear mechanisms 17*a*, 17*b* via the bevel gear 15 and the horizontal shaft 16.

An output shaft fixed to a planetary carrier of a left planetary gear mechanism 17*b* of the pair of planetary gear mechanisms 17*a*, 17*b* is coupled to a left sprocket 28*b* (left drive wheel) described later via the left brake assembly 18*b* and the left final reduction gear 19*b*. An output shaft fixed to a planetary carrier of a right planetary gear mechanism 17*a* is coupled to a right sprocket 28*a* (right drive wheel) described later via a right brake assembly 18*a* and a right final reduction gear 19*a*. Drive force transmitted at each ring gear of the planetary gear mechanisms 17*a*, 17*b* from the horizontal shaft 16 is transmitted from each planetary carrier of the planetary gear mechanisms 17*a*, 17*b* to the sprockets 28*a*, 28*b* of each traveling apparatus 4*a*, 4*b* via each final reduction gears 19*a*, 19*b*.

1-3 Traveling Apparatuses 4*a*, 4*b*

The traveling apparatuses 4*a*, 4*b* include the left sprocket 28*b* and the right sprocket 28*a*, and crawler tracks 29*a*, 29*b* wrapped around each sprocket 28*a*, 28*b*. As described above, drive force from the engine 2 is transmitted to the sprockets 28*a*, 28*b* via the first power transmission mechanism 3. When the sprockets 28*a*, 28*b* are rotatably driven, the crawler tracks 29*a*, 29*b* wrapped around the sprockets 28*a*, 28*b* are driven and the working vehicle 1 travels as a result. In this way, some of the horsepower of the engine 2 is consumed for causing the working vehicle 1 to travel.

1-4. First Hydraulic Pump 5

The first hydraulic pump 5 is driven by the drive force from the engine 2 and emits pressurized oil in order to drive a hydraulic cylinder 31 of the working equipment 7 described later and a hydraulic motor 32 of the turning mechanism 6. The first hydraulic pump 5 is a variable capacity-type hydraulic pump capable of controlling discharge capacity by controlling a swash plate angle. A swash plate angle control mechanism 33 for controlling the swash plate angle and a control valve 34 (hereinafter referred to as "first hydraulic pump control valve 34") for restricting torque of the first hydraulic pump 5 are fitted at the first hydraulic pump 5. The first hydraulic pump control valve 34 is an electromagnetic proportional control valve. The control unit 10 is capable of controlling discharge capacity of the first hydraulic pump 5 and controls the upper limit value for absorption torque of the first hydraulic pump 5 by controlling an instruction signal to the first hydraulic pump control valve 34.

1-5. Turning Mechanism 6

The turning mechanism 6 is a mechanism for causing the working vehicle 1 to turn as a result of the rotational speeds of the right sprocket 28*a* and the left sprocket 28*b* being different. The turning mechanism 6 includes the hydraulic motor 32 and a second power transmission mechanism 35.

The hydraulic motor 32 is driven by pressurized oil from the first hydraulic pump 5.

The second power transmission mechanism 35 is configured from the required gear trains and meshes with a gear fixed to the output shaft of the hydraulic motor 32, a gear fixed integrally at a sun gear of the left planetary gear mechanism 17*b*, and a gear fixed integrally at a sun gear of the right planetary gear mechanism 17*a*. The second power transmission mechanism 35 transmits drive force of the hydraulic motor 32 from each sun gear of the left and right planetary gear mechanisms 17*a*, 17*b* to the left and right sprockets 28*a*, 28*b* via each of the planetary carriers and each of the final reduction gears 19*a*, 19*b* and is capable of causing the working vehicle 1 to turn to the left and right by making the speeds different at the left and right sprockets 28*a*, 28*b*.

A control valve 36 (hereinafter referred to as "flow control valve 36") is provided for controlling the flow rate of pressurized oil and switching paths in a pressurized oil path linking the first hydraulic pump 5 and the hydraulic motor 32. The flow control valve 36 controls the amount of pressurized oil supplied to the hydraulic motor 32 and the supplied direction based on the instruction signal from the control unit 10. It is therefore possible to control the rotational speed and direction of rotation of the output shaft of the hydraulic motor 32 and to change the turning radius and turning direction of the working vehicle 1.

1-6. Working Equipment 7

The working equipment 7 has a blade (not shown) and the hydraulic cylinder 31 for driving the blade. The blade is provided at a front part of the working vehicle 1 and is a member for carrying out operations such as top-soiling. The hydraulic cylinder 31 is driven by pressurized oil from the first hydraulic pump 5. A working equipment operation valve 37 that controls pressurized oil supplied to the hydraulic cylinder 31 from the first hydraulic pump 5 based on an instruction signal from the control unit 10 is provided at a pressurized oil path linking the hydraulic cylinder 31 and the first hydraulic pump 5. A number of hydraulic cylinders 31 for lifting, angling, and tilting are provided at the working vehicle 1 but only one is shown in FIG. 1, with the remaining hydraulic cylinders 31 being omitted. The working equipment operation valve 37 receives an instruction signal from the control unit 10 and switches over the amount of pressurized oil supplied to the hydraulic cylinder 31 and the supply direction. It is therefore possible for blade operations such as lifting, angling, and tilting to be carried out.

1-7. Cooling Mechanism 8

The cooling mechanism 8 includes the second hydraulic pump 12 driven by drive force from the engine 2, a hydraulic motor 38 driven by pressurized oil supplied by the second hydraulic pump 12, and a cooling fan 39 driven by the hydraulic motor 38. The cooling mechanism 8 cools the cooling water of the engine 2 and the pressurized oil using a flow of air created by the cooling fan 39. A cooling fan operation valve 41 is provided between the hydraulic motor 38 and the second hydraulic pump 12. It is then possible to switch the direction of flow of pressurized oil supplied to the hydraulic motor 38 as a result of the cooling fan operation valve 41 performing control in accordance with an instruction signal from the control unit 10. It is then possible to control the direction of rotation of the hydraulic motor 38, i.e. the direction of rotation of the cooling fan 39. A second hydraulic pump control valve 42 that controls the discharge capacity of the second hydraulic pump 12 based on an instruction signal from the control unit 10 is provided at the second hydraulic pump 12. The rotational speed of the cooling fan can then be controlled as a result of control by the second hydraulic pump control valve 42.

1-8. Operation Unit 9 and Various Sensors

The operation unit 9 is built into the operator's cab (not shown) so as to enable various operations to be performed at the working vehicle 1 as a result of operation by the operator. The content of operations performed by the operation unit 9 are sent to the control unit 10 as an operation signal. The operation unit 9 includes a shift switch 43, a travel/turning operation lever 44, a throttle instruction device 45, a deceleration instruction device 46, a working equipment lever 47, and a control mode switching device 48, etc.

The shift switch 43 is for switching gears of the transmission 14. At the working vehicle 1, switching of gears of the transmission 14 from the first to third gears is possible. It is also possible to switch over gears manually as a result of the operator operating the shift switch 43.

The travel/turning operation lever 44 is a member for instructing the switching of the working vehicle 1 between going forwards and going in reverse, switching between going straight and turning, and switching the turning direction. The operator can switch over the transmission 14 between a forward state, a reversing state, and a neutral state through operation of the travel/turning operation lever 44. The operator can also switch the working vehicle 1 between going straight and turning, switch the turning direction, and regulate the turning speed by operating the travel/turning operation lever 44.

The throttle instruction device 45 is for changing the engine speed. The engine speed instructed by the throttle instruction device 45 is inputted to the control unit 10. The control unit 10 then controls the engine 2 so that the engine speed becomes the instructed speed.

The deceleration instruction device 46 is for reducing the engine speed and reduces engine speed instruction values outputted to the engine 2 from the control unit 10 from usual values.

The working equipment lever 47 is for operating the working equipment 7 and is for carrying out lifting, angling, and tilting etc. of the blade according to the operation content of the working equipment lever 47.

The control mode switching device 48 is for the operator to select one of either a first control mode targeting high engine output or a second control mode targeting low engine output. The content of these control modes is described in the following.

The various sensors include a first pump discharge pressure sensor S1, an engine speed sensor S2, and a transmission speed sensor S3. The first pump discharge pressure sensor S1 detects the discharge pressure of the first hydraulic pump 5. The engine speed sensor S2 detects the actual engine speed of the engine 2. The transmission speed sensor S3 detects the speed of the output shaft of the transmission 14. Various information detected by the sensors S1 to S3 is inputted to the control unit 10 as a detection signal.

1-9. Control Unit 10

The control unit 10 is mainly constituted by an operation processing unit such as a microcomputer or an arithmetic processor etc. and stores control data. The control unit 10 controls the engine 2, the first power transmission mechanism 3, the turning mechanism 6, the working equipment 7, and the cooling mechanism 8 based on operation signals from the operation unit 9, detection signals from the various sensors, and control data stored in the control unit 10. The control unit 10 includes a first control unit 51 and a second control unit 52. The first control unit 51 mainly controls the first power transmission mechanism 3, the turning mechanism 6, the working equipment 7, and the cooling mechanism 8. The second control unit 52 mainly controls the engine 2.

The first control unit 51 selects the gears appropriately depending on the vehicle speed and engine speed by switching over the lock-up clutch 20 of the torque converter 13 and switching over speed clutches 24 to 26 based on the vehicle speed and the engine speed. For example, the first control unit 51 switches over the transmission 14 from low-speed gears to high-speed gears in accordance with an increase in the engine speed. Further, the first control unit 51 switches over the lock-up clutch 20 in accordance with the engine speed even if the transmission 14 is the same gear. For example, when the gear of the transmission 14 is first gear and the engine speed is a predetermined value or more, the lock-up clutch 20 is put on. Further, the lock-up clutch 20 is put off when the engine speed is smaller than a predetermined value even when the gear of the transmission 14 is first gear. It is therefore possible to improve the fuel consumption of the working vehicle 1 when traveling.

The first control unit 51 also switches over the forward hydraulic clutch 22 and the reverse hydraulic clutch 23 of the transmission 14 and switches over the speed clutches 24 to 26 in accordance with operations of the shift switch 43 and the travel/turning operation lever 44. It is therefore possible for the operator to switch between forwards and reverse and switch between gears manually. The first control unit 51 can also control the rotational speed of the hydraulic motor 32 so as to control the turning speed by controlling the flow control valve 36 in accordance with operation of the travel/turning operation lever 44.

The engagement state of the lock-up clutch 20 is inputted to the first control unit 51 as a state signal from the torque converter operation valve 21. The engagement states of each of the clutches 22 to 26 of the transmission 14 are also inputted to the first control unit 51 as state signals from the transmission operation valve 27.

Figure 2:
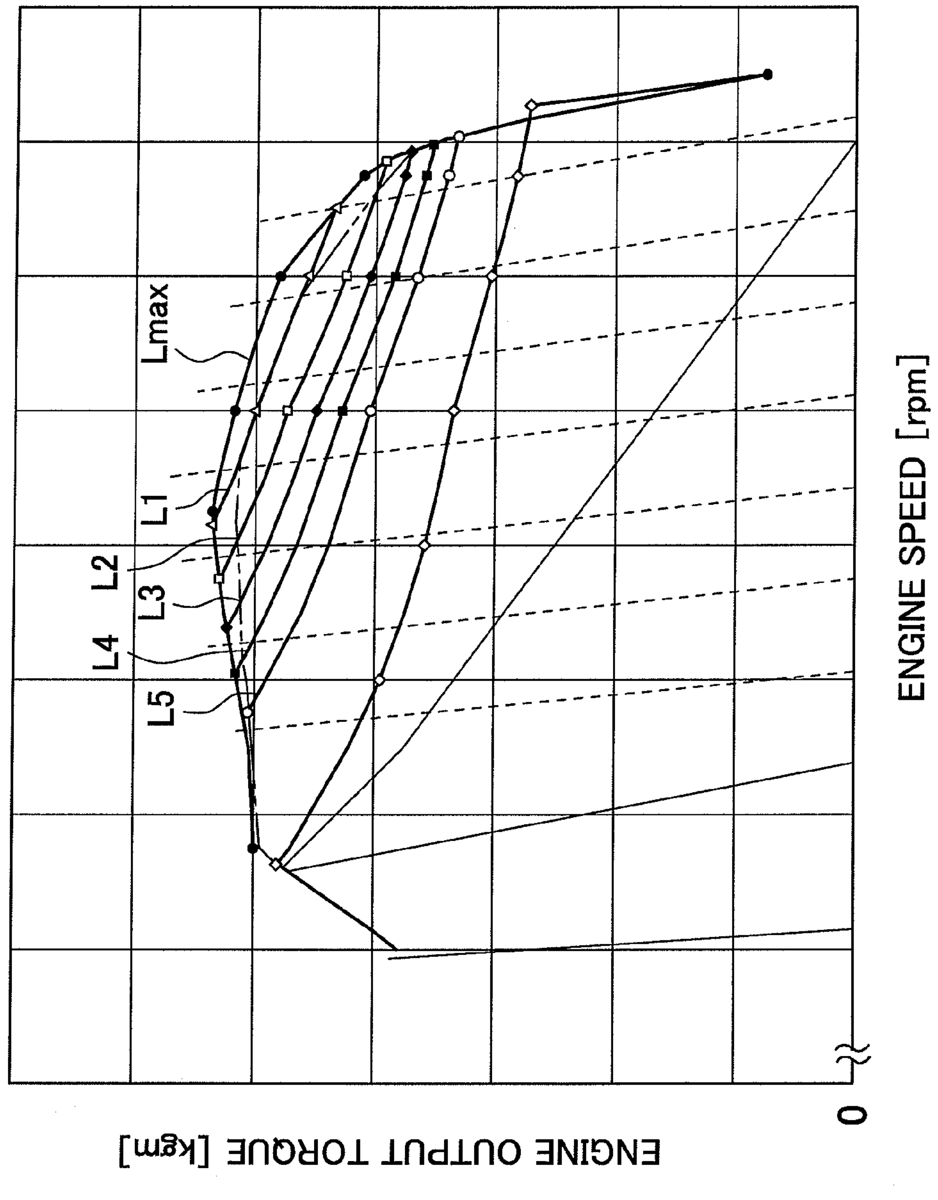
FIG. 2 is a view showing examples of different engine power curves.

An engine power curve indicating a relationship between the engine speed and the engine output torque as shown in FIG. 2 is stored in a second control unit 52. The second control unit 52 then controls the engine 2 based on the engine power curve. At the working vehicle 1, it is possible to change the engine power curve used to control the engine 2 into a plurality of engine power curves. The engine power curve used to control the engine can then be decided depending on the conditions. Engine output control using this engine power curve is described in detail in the following.

2. Absorption Torque Control of First Hydraulic Pump 5

At this working vehicle 1, the first control unit 51 can control the absorption torque of the first hydraulic pump 5 according to the traveling load by controlling the first hydraulic pump control valve 34 based on the speed ratio of the torque converter 13 and the engine speed. In the following, a description is given of absorption torque control of the first hydraulic pump 5.

First, the first control unit 51 determines the gear selected at the transmission 14 and whether this is forwarding or reversing based on the state signal from the transmission operation valve 27 and the operation signal of the travel/turning operation lever 44 and calculates the current reduction ratio of the transmission 14 based on the results of the determination. The first control unit 51 then calculates the speed ratio e of the torque converter 13 from equation (1) below based on the current reduction ratio of the transmission 14, the engine speed detected by the engine speed sensor S2, and the actual speed of the output shaft of the transmission 14 detected by the transmission speed sensor S3.

$$e=Nt\times i/Ne \qquad (1)$$

Where:

Nt: actual speed of the output shaft of the transmission 14 i: current reduction ratio of the transmission 14

Ne: engine speed

Figure 3:
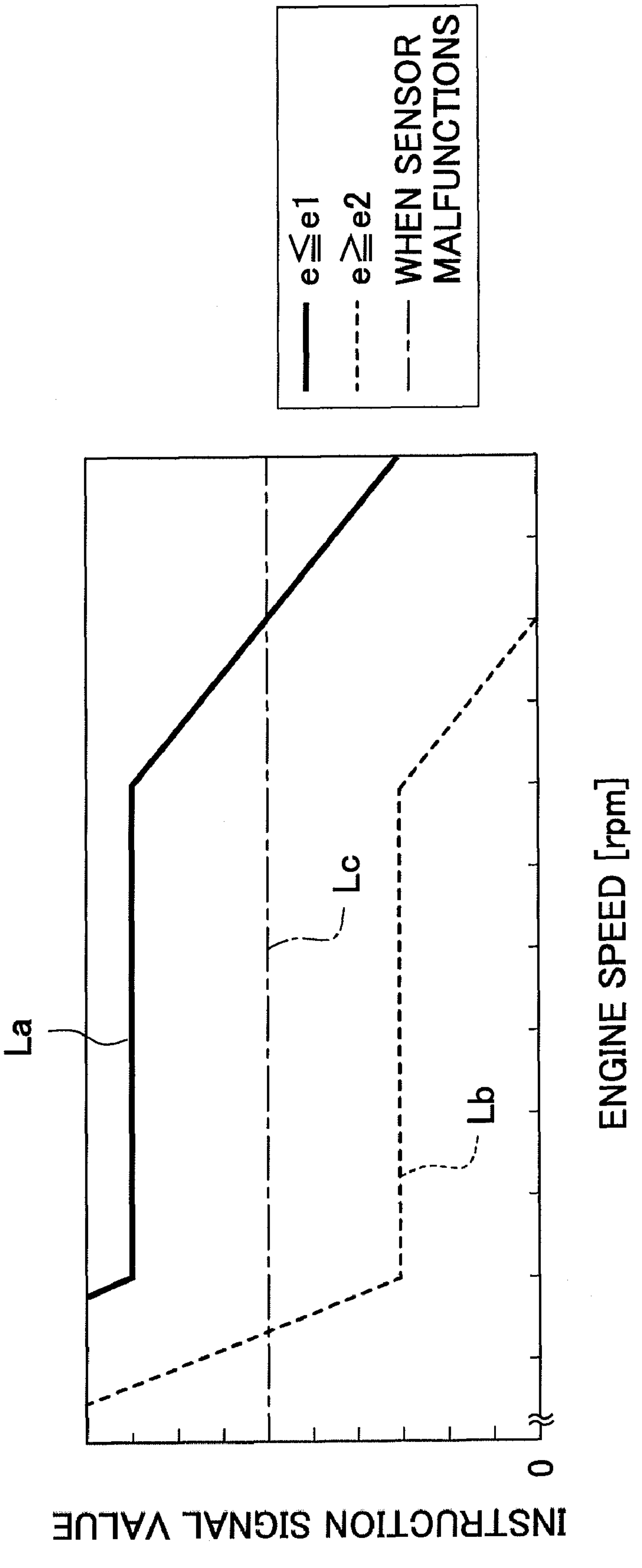
FIG. 3 is a graph showing a relationship between engine speed and an instruction signal value sent to a first hydraulic pump control valve.

Next, the first control unit 51 decides the value of the instruction signal to the first hydraulic pump control valve 34 based on the speed ratio of the torque converter 13 and the engine speed. As shown in FIG. 3, when the speed ratio of the torque converter 13 is $e \leqq e1$ (where e1 is a constant), the first control unit 51 decides the instruction signal value to the first hydraulic pump control valve 34 from the engine speed detected by the engine speed sensor S2 based on the characteristic line La indicating the relationship between the engine speed and the instruction signal value to the first hydraulic pump control valve 34. The instruction signal value to the first hydraulic pump control valve 34 corresponds to the limit value of the absorption torque of the first hydraulic pump 5. The limit value of the absorption torque of the first hydraulic pump 5 therefore becomes larger for a smaller instruction signal value going to the first hydraulic pump control valve 34. When the speed ratio of the torque converter 13 is $e \leqq e2$ (where e2 is a constant greater than e1), the first control unit 51 decides the instruction signal value sent to the first hydraulic pump control valve 34 based on a characteristic line Lb. Further, although not depicted in FIG. 3, when the speed ratio of the torque converter 13 is $e=e3$ ($e1<e3<e2$), the value of the instruction signal sent to the first hydraulic pump control valve 34 is decided based on a characteristic line for between characteristic lines La and Lb decided according to the size of the speed ratio e of the torque converter 13. When the engine 2 is driven but the engine speed sensor S2 is malfunctioning, a predetermined instruction signal value is selected (refer to characteristic line Lc of FIG. 3).

In the above, when the speed ratio e of the torque converter 13 is comparatively small, i.e. when the traveling load is comparatively large, the first control unit 51 makes the value of the instruction signal sent to the first hydraulic pump control valve 34 large and lowers the limit value of the absorption torque of the first hydraulic pump 5. It is therefore capable of increasing the horsepower which the torque converter 13 absorbs from the engine 2. Further, when the speed ratio e of the torque converter 13 is comparatively large, i.e. when the traveling load is comparatively small, the value of the instruction signal sent to the first hydraulic pump control valve 34 is made small and the limit value of the absorption torque of the first hydraulic pump 5 is increased. It is capable of increasing the horsepower which the first hydraulic pump 5 absorbs from the engine 2. It is therefore possible to control the limit value for absorption torque of the first hydraulic pump 5 according to the traveling load.

3. Engine Output Control

At this working vehicle 1, not only is control of a limit value for the absorption torque of the first hydraulic pump 5 according to the traveling load described above carried out, but also engine output control that changes the engine power curve used to control the engine 2 based on the absorption horsepower ("steering absorption horsepower" in the following) of the first hydraulic pump 5 is carried out. For example, as shown in FIG. 2, it is possible to change the plurality of engine power curves L1 to L5 with reduced engine output torque with respect to the maximum engine power curve Lmax so that the engine output torque becomes a maximum. In the following, the engine power curves L1 to L5 are given the names of a first power curve L1 to a fifth power curve L5 in order of size of the engine output torque.

First, the first control unit 51 calculates the steering absorption horsepower from the following equation (2) based on a discharge pressure (hereinafter referred to as "first discharge pressure") of the first hydraulic pump 5, a pump capacity (hereinafter referred to as "first pump capacity") of the first hydraulic pump 5, and a speed (hereinafter referred to as "first pump speed") of the first hydraulic pump 5.

$$Lp=\beta \times Ps \times qs \times Np \qquad (2)$$

Here;

Lp: steering absorption horsepower

B: predetermined coefficient

Ps: first discharge pressure qs: first pump capacity

Np: first pump speed

Figure 4:
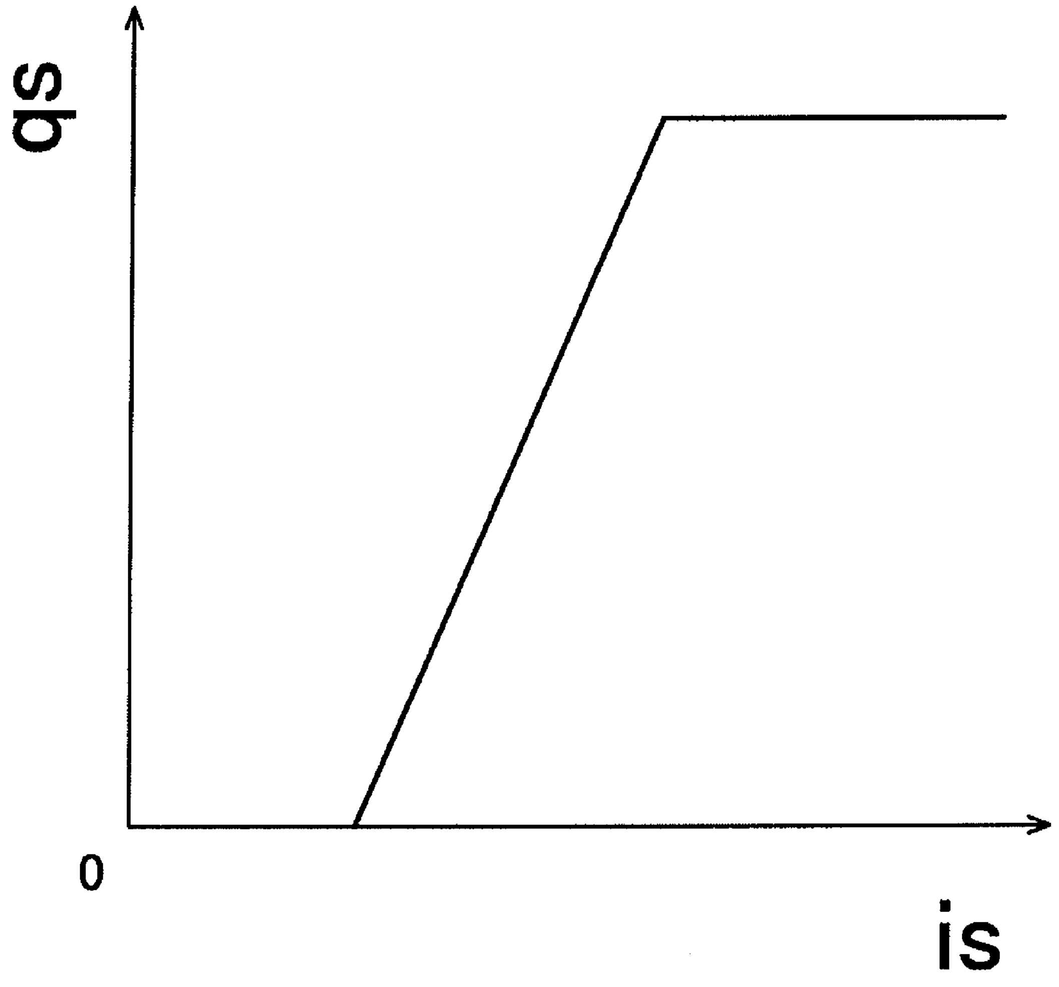
FIG. 4 is a graph showing a relationship between an instruction value sent to a flow rate control valve and a first pump capacity.

The first discharge pressure Ps is detected by the first pump discharge pressure sensor S1. A value calculated from the instruction value sent to the flow control valve 36 can be used as the first pump capacity qs. Specifically, the first control unit 51 stores a map indicating the relationship between the first pump capacity "qs" and the instruction value "is" sent to the flow control valve 36, as shown in FIG. 4. By referring to this map, it is then possible to obtain the first pump capacity "qs" from the instruction value "is" sent to the flow control valve 36. The instruction value "is" sent to the flow control valve 36 is a value for an instruction signal sent by the first control unit 51 to the flow control valve 36 based on the operation signal from the travel/turning operation lever 44. The first pump speed Np is obtained from the following equation (3) based on the engine speed detected by the engine speed sensor S2.

$$Np=\gamma \times Ne \qquad (3)$$

Here;

γ: predetermined coefficient

Ne: engine speed

Next, the engine power curve used in control of the engine 2 is decided by the first control unit 51 based on the size of the calculated steering absorption horsepower Lp. As shown in FIG. 5, the decided engine power curve is different depending on the state of the lock-up clutch 20 and which of the first control mode and the second control mode is selected.

First, a description is given of when the lock-up clutch 20 is on (refer to "L/C on" in FIG. 5) and the first control mode is selected. When the steering absorption horsepower Lp is smaller than a predetermined first reference value α1, the third engine power curve L3 (refer to FIG. 2) is decided upon as the engine power curve used in control of the engine 2. When the steering absorption horsepower Lp is the predetermined first reference value α1 or more and is a second reference value α2 (α2>α1) or less, the second engine power curve L2 is decided upon as the engine power curve used in control of the engine 2. Further, when the steering absorption horsepower Lp is larger than the second reference value α2, the first engine power curve L1 is decided upon as the engine power curve used in control of the engine 2. In this way, when the steering absorption horsepower Lp is increased, the engine power curve used in control of the engine 2 is changed to an engine power curve of a higher torque. When the steering absorption horsepower Lp is smaller than the first reference value α1, a small turning load is exhibited and the case where the working vehicle 1 moves in a straight line is included. When the steering absorption horsepower Lp is large, the turning load is shown to be large.

Next, a description is given of when the lock-up clutch 20 is on and the second control mode is selected. When the steering absorption horsepower Lp is smaller than the predetermined first reference value α1, the fifth engine power curve L5 is decided upon as the engine power curve used in control of the engine 2. When the steering absorption horsepower Lp is the predetermined first reference value α1 or more and is a second reference value α2 or less, the fourth engine power curve L4 is decided upon as the engine power curve used in control of the engine 2. Further, when the steering absorption horsepower Lp is larger than the second reference value α2, the third engine power curve L3 is decided upon as the engine power curve used in control of the engine 2. In this way, as in the case where the first control mode is selected as described above, when the steering absorption horsepower Lp is increased, the engine power curve used in control of the engine 2 is changed to an engine power curve of a higher torque. However, when the first control mode is selected, it is possible to change the engine power curve within a first range (a range from the third engine power curve L3 to the first engine power curve L1 in FIG. 2) of comparatively high torque from the third engine power curve L3 to the first engine power curve L1. Further, when the second control mode is selected, it is possible to change the engine power curve within a second range (a range from the fifth engine power curve L5 to the third engine power curve L3 in FIG. 2) of comparatively low torque from the fifth engine power curve L5 to the third engine power curve L3.

When the lock-up clutch 20 is off (refer to "L/C off" of FIG. 5) and the first control mode is selected, the first engine power curve L1 is decided upon as the engine power curve used in control of the engine 2 regardless of the size of the steering absorption horsepower Lp. When the lock-up clutch 20 is off and the second control mode is selected, the third engine power curve L3 is decided upon as the engine power curve used in control of the engine 2 regardless of the size of the steering absorption horsepower Lp.

4. Features

With this working vehicle 1, the engine power curve used to control the engine 2 is changed based on the steering absorption horsepower. The engine output torque can therefore be changed. The steering absorption horsepower is also changed according to the size of the turning load. The engine 2 can therefore be controlled at the working vehicle 1 so that the engine output torque is increased when the turning load is large. This means that even if the horsepower consumed at the turning mechanism 6 is substantial, it is possible to suppress falls in the horsepower consumed at the traveling apparatus 4*a*, 4*b* and it is possible to suppress drops in traction performance. Further, reductions in the engine speed can be suppressed.

With the working vehicle 1, in addition to the traveling apparatus 4*a*, 4*b* and the turning mechanism 6, horsepower of the engine 2 is also consumed by the working equipment 7 and the cooling mechanism 8. However, the horsepower consumed by the working equipment 7 and the cooling mechanism 8 is small compared to the horsepower consumed by the traveling apparatus 4*a*, 4*b* and the turning mechanism 6. This therefore does not influence the control described above.

In the embodiment described above, when the lock-up clutch 20 is off, changing of the engine power curve based on the steering absorption horsepower is not carried out. However, in this case, transmission of the drive force from the engine 2 is carried out by the torque converter 13. It is therefore more difficult for lowering of the engine speed to occur compared to when the lock-up clutch 20 is on. In this regard, when the lock-up clutch 20 is on, the output shaft of the engine 2 and the input shaft of the transmission 14 are directly linked. This means that lowering of the engine speed can easily occur but lowering of the engine speed can be suppressed by changing the engine power curve based on the steering absorption horsepower, as described above.

5. Other Embodiments (a) The engine power curves used to control the engine 2 are by no means limited to the above, and changing a greater number of changes to the engine power curve is also possible. Further, the number of engine power curves that can be changed can be fewer than described above.

(b) In the above embodiment, it is determined whether or not the steering absorption horsepower belongs to one of three ranges. However the ranges of steering absorption horsepower used in this determination are by no means limited to the above. Further, the engine power curve does not have to change gradually each of a plurality of ranges but rather the engine power curve used to control the engine 2 can change successively in accordance with the size of the steering absorption horsepower.

(c) The embodiment described above decides a limit value for the absorption torque of the first hydraulic pump 5 based on the engine speed and the speed ratio of the torque converter 13. However, the limit value of the absorption torque of the first hydraulic pump 5 can also be decided using other methods.

(d) In the above embodiment, when the lock-up clutch 20 is off, the engine power curve is not changed based on the steering absorption horsepower but it is also possible to change the engine power curve based on the steering absorption horsepower even when the lock-up clutch 20 is off.

(e) In the above embodiment, an example is shown taking a bulldozer as a working vehicle but the present invention can also be applied to other working vehicles.

The embodiment illustrated above is therefore capable of suppressing reduction of engine speed and reduction of traction performance during turning and is useful as a working vehicle.

What is claimed is:

1. A working vehicle comprising:
- an engine;
- a left drive wheel and a right drive wheel configured and arranged to be driven by a drive force from the engine;
- a first power transmission mechanism configured and arranged to transmit the drive force from the engine to the left drive wheel and the right drive wheel;
- a hydraulic pump configured and arranged to be driven by the drive force from the engine;
- a turning mechanism having a hydraulic motor configured and arranged to be driven by pressurized oil from the hydraulic pump and a second power transmission mechanism configured and arranged to transmit the drive force of the hydraulic motor to the right drive wheel and the left drive wheel, the turning mechanism being configured and arranged to cause the working vehicle to turn by differentiating a rotational speed of the right drive wheel from a rotational speed of the left drive wheel; and
- a control unit configured to control the engine based on an engine power curve indicating a relationship between an engine speed and an engine output torque,
- the control unit being further configured to calculate an absorption horsepower of the hydraulic pump, and to change the engine power curve used to control the engine based on the absorption horsepower.

2. The working vehicle according to claim 1, wherein the control unit is configured to change the engine power curve used to control the engine to a high-torque engine power curve when the absorption horsepower increases.

3. The working vehicle according to claim 2, wherein the control unit is configured to selectively execute a first control mode that targets high engine output and a second control mode that targets low engine output, to change the engine power curve used to control the engine within a predetermined first range when the first control mode is selected, and to change the engine power curve used to control the engine within a predetermined second range encompassing a lower torque than the first range when the second control mode is selected.

4. The working vehicle according to claim 1, wherein the first power transmission mechanism has a torque converter with a lock-up clutch, and the control unit is configured to change the engine power curve used to control the engine based on the absorption horsepower when the lock-up clutch is engaged.

* * * * *